(12) United States Patent
Ottaviano et al.

(10) Patent No.: US 8,147,178 B2
(45) Date of Patent: Apr. 3, 2012

(54) CENTRIFUGAL COMPRESSOR FORWARD THRUST AND TURBINE COOLING APPARATUS

(75) Inventors: Marcus Joseph Ottaviano, North Reading, MA (US); Robert John Parks, Ipswich, MA (US); John Lawrence Noon, Swampscott, MA (US); Mark Michael D'Andrea, Belmont, MA (US); Thomas Michael Regan, Marblehead, MA (US); Aaron Todd Williams, West Chester, OH (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 12/342,972

(22) Filed: Dec. 23, 2008

(65) Prior Publication Data
US 2010/0158668 A1    Jun. 24, 2010

(51) Int. Cl.
*F01D 3/04* (2006.01)
(52) U.S. Cl. ..................................... 415/104
(58) Field of Classification Search ............. 415/104
See application file for complete search history.

(56) References Cited

U.S. PATENT DOCUMENTS

| | | | |
|---|---|---|---|
| 3,979,903 A | 9/1976 | Hull, Jr. et al. | |
| 4,462,204 A | 7/1984 | Hull | |
| 4,576,550 A | 3/1986 | Bryans | |
| 4,697,981 A * | 10/1987 | Brown et al. | 415/104 |
| 5,555,721 A * | 9/1996 | Bourneuf et al. | 60/806 |
| 6,190,123 B1 | 2/2001 | Wunderwald et al. | |
| 6,585,482 B1 | 7/2003 | Liotta et al. | |
| 7,287,384 B2 | 10/2007 | Fish et al. | |

* cited by examiner

*Primary Examiner* — Thomas L Dickey
*Assistant Examiner* — Joseph Schoenholtz
(74) *Attorney, Agent, or Firm* — William Scott Andes; Steven J. Rosen

(57) ABSTRACT

A gas turbine engine centrifugal compressor axial forward thrust apparatus bleeds impeller tip aft bleed flow from between an annular centrifugal compressor impeller of a high pressure rotor and a diffuser directly downstream of the impeller. The apparatus then uses the aft bleed flow to pressurize an annular cavity extending radially between an inner combustor casing and the rotor and extending axially between forward and aft thrust balance seals. Forward and aft thrust balance lands are in sealing engagement with the forward and aft thrust balance seals on the high pressure rotor respectively. An annular stator plenum in fluid communication with the annular cavity is bounded in part by a forward end wall having conical diffusion holes therethrough which may be axially or circumferentially or axially and circumferentially angled. The forward thrust balance seal may be on an aft conical arm of the impeller.

40 Claims, 7 Drawing Sheets

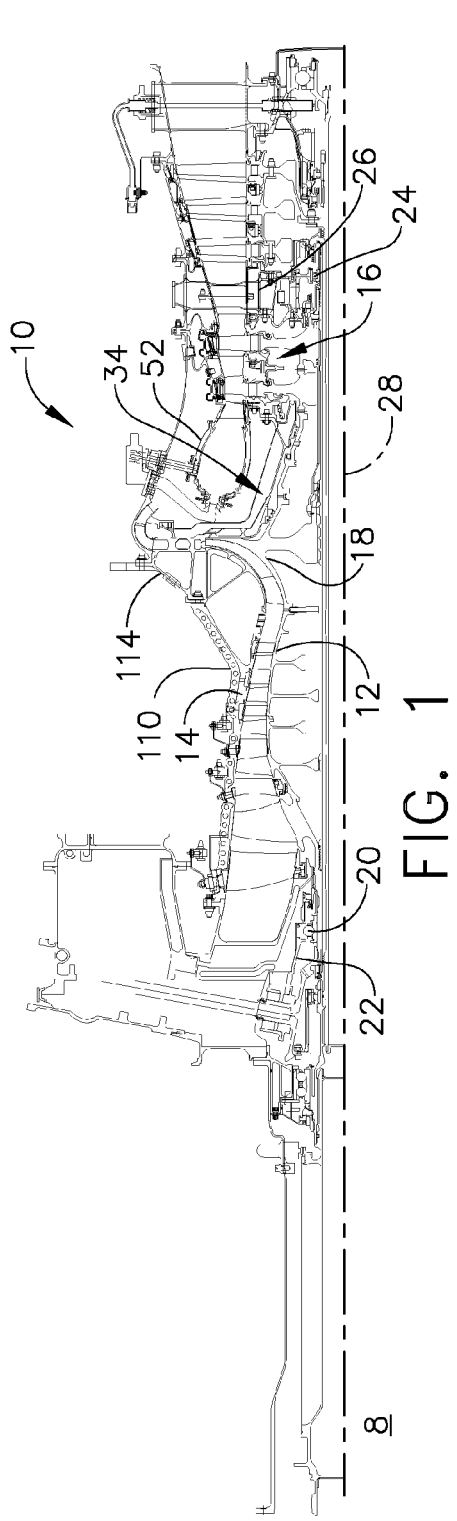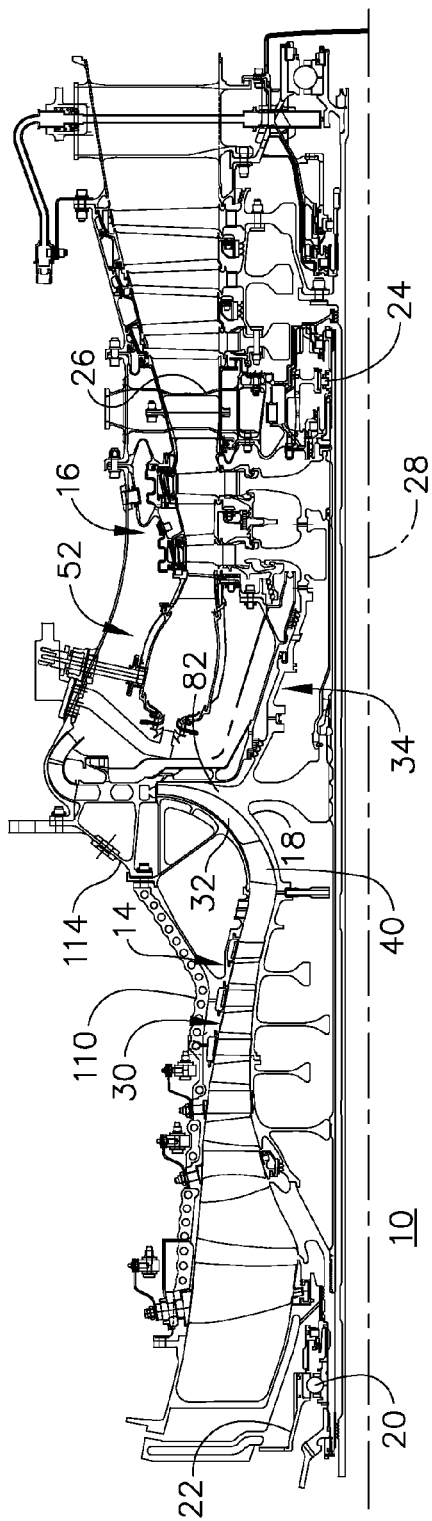

CENTRIFUGAL COMPRESSOR FORWARD THRUST AND TURBINE COOLING APPARATUS

GOVERNMENT INTERESTS

This invention was made with government support under government contract No. N00019-06-C-0081 awarded by the Department of Defense. The government has certain rights to this invention.

BACKGROUND OF THE INVENTION

1. Technical Field

The present invention relates generally to gas turbine engines having centrifugal compressors and, more specifically, maintaining forward thrust on a centrifugal compressor impeller.

2. Background Information

Positive forward rotor thrust is critical to the operation of a centrifugal compressor gas turbine engine. Maintaining a positive forward thrust on the impeller, or "rotor thrust" as it is often referred to, helps minimize the clearances between the shroud and blades of the impeller. Minimizing these clearances increases fuel efficiency and is often useful or necessary to satisfy required fuel efficiency specifications. Additionally, sufficiently small clearances must be maintained between the shroud and blades of the impeller in order to minimize losses between the tips of the blades and the shroud and to maintain sufficient stall margin. It is also important to avoid the rotor thrust to crossing over into the negative rotor thrust regime which could damage the engine. The resulting deflection of the overall rotor including the rotating hardware in the gas generator turbine, where tight clearances are maintained, could result in a damaging rub between rotating and stator hardware.

It is known in the art to minimize clearance between the blade tips of an impeller rotating within a gas turbine engine and a surrounding blade tip shroud to reduce leakage of a working fluid around the blade tips of centrifugal compressor stages. It is known that rotor thrust may be controlled by proper design of an inner radius of a swirl plate along an impeller backwall, which has only limited forward rotor thrust capability. A radial static pressure gradient along the impeller backwall exists as a result of windage losses between the rotor and stator. The precise design of the swirl plate inner radius results in a specific static pressure and piston area in which the impeller backwall bleed area provides forward pressure on the impeller, thus, positive forward rotor thrust.

It is known that increasing the inner radius of the swirl plate results in less windage losses and higher air static pressure in the cavity aft of the impeller as well as increased piston area aft of the impeller and, thus, increased forward rotor thrust. However, with this configuration, there exists a practical limit on how much forward rotor thrust can be achieved due to the limitations on how high the inner radius of the swirl plate can be designed. This capability of increasing forward rotor thrust by increasing the swirl plate inner radius is even more limited in the case where clean air from the impeller is used for turbine cooling since a windage shield would be necessary between the rotor and static inner combustor case.

Conventional engines employ clean air bleed systems to cool turbine components in gas turbines using an axi-centrifugal compressor as is done in the General Electric CFE738 engine. The turbine cooling supply air exits the centrifugal diffuser through a small gap between the diffuser exit and deswirler inner shroud. This air is then ducted radially inward by expensive integrally cast passages to the inside of the inner combustion case where it is then ducted into an accelerator via an arduous path where the airflow must make several 90 degree turns generating losses (and thus raising the temperature of the cooling air) before going through the accelerator. After leaving the accelerator, this cooling air travels up along a stage 1 turbine disk into a stage 1 turbine blade.

Thus, there continues to be a demand for advancements in impeller or rotor positive thrust control to maintain proper impeller blade tip clearance technology and provide efficient turbine cooling air from the impeller.

BRIEF DESCRIPTION OF THE INVENTION

A gas turbine engine centrifugal compressor axial forward thrust apparatus includes an annular centrifugal compressor impeller of a high pressure rotor, an impeller bleed means for bleeding impeller tip aft bleed flow from between the impeller and a diffuser directly downstream of the impeller, and a pressurizing means for using the aft bleed flow to pressurize an annular cavity extending radially between an inner combustor casing and the high pressure rotor and extending axially between forward and aft thrust balance seals.

An exemplary embodiment of the apparatus includes an annular stator plenum in fluid communication with the annular cavity is bounded in part by a forward end wall and the pressurizing means includes conical diffusion holes in the forward end wall. The conical diffusion holes may be axially or circumferentially or axially and circumferentially angled. The apparatus may further include metering holes, which may be circumferentially angled, in the inner combustor casing between the annular stator plenum and the annular cavity. Forward and aft thrust balance lands are in sealing engagement with the forward and aft thrust balance seals on the high pressure rotor respectively. The forward thrust balance seal may be located on an aft conical arm of the impeller of the rotor.

The gas turbine engine centrifugal compressor axial forward thrust apparatus may be incorporated in a gas turbine engine assembly including a combustor between a high pressure compressor and a high pressure turbine. An exemplary embodiment of the assembly further includes an annular combustor stator assembly having a forward end wall extending radially outwardly from and joined to the inner combustor casing, a radially outer portion of the forward end wall being an aft wall of the diffuser, a stator plenum disposed between and in fluid communication with the impeller and the annular cavity, and the stator plenum being in part bounded by a radially inner portion of the forward end wall and an annular cover spaced axially aftwardly of the radially inner portion of the forward end wall.

A cooling air bleed means for bleeding clean cooling air from a bleed location downstream of an outlet of the diffuser is in fluid communication with one or more cooling air channels having generally radially extending sections followed by generally axially aftwardly extending sections. The one or more channels are in fluid communication with an annular cooling air plenum having one or more accelerators. The cooling air bleed means includes an annular manifold in fluid communication with a bleed location downstream of an outlet of the diffuser where compressor discharge pressure air enters a deswirl cascade along an internal radius portion.

Each of the cooling air channels includes a channel inner wall formed and running along a radially outer portion of the forward end wall, the annular cover, and the inner combustor casing. The channel inner wall includes a generally radially extending radial wall section connected to a generally axially aftwardly extending axial wall section by a curved wall section. Circumferentially spaced apart channel side walls extend outwardly from the channel inner wall and a channel outer wall is spaced outwardly from the channel inner wall and attached to the channel side walls. Each of the cooling air channels terminate at an aft conical section of the inner combustor casing between the annular cooling air plenum and the cooling air channels and cooling air apertures are disposed through the aft conical section.

BRIEF DESCRIPTION OF THE DRAWINGS

FIG. 1 is a sectional view illustration of a gas turbine engine having a centrifugal compressor impeller forward thrust apparatus.

FIG. 2 is an enlarged sectional view illustration of the gas generator illustrated in FIG. 1.

DETAILED DESCRIPTION OF THE INVENTION

Figure 3:
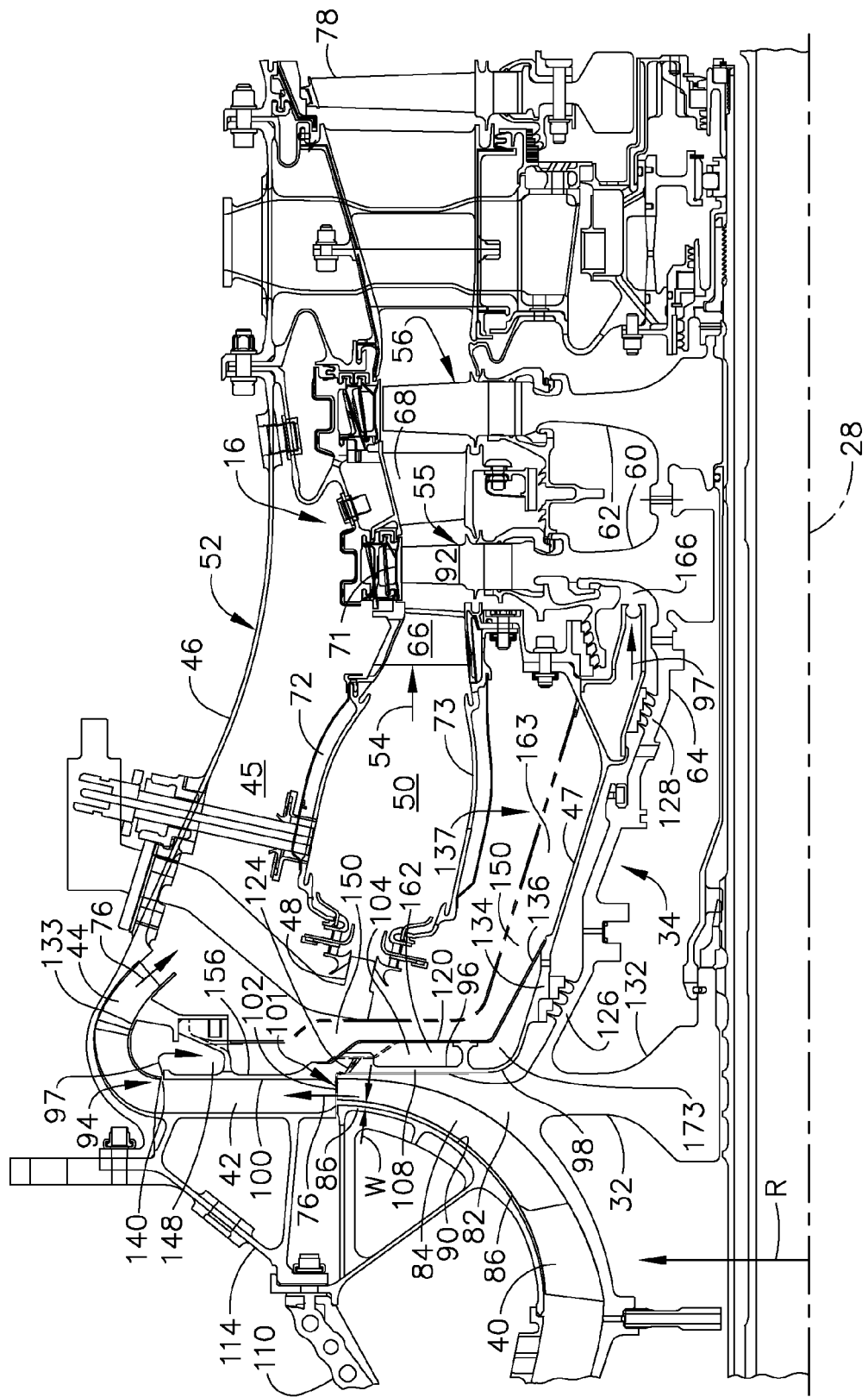
FIG. 3 is an enlarged sectional view illustration of the centrifugal compressor and the forward thrust apparatus illustrated in FIG. 2.

Illustrated in FIG. 1, gas turbine engine 8 with a high pressure gas generator 10 having a single stage centrifugal compressor 18 as a final compressor stage and an axial forward thrust apparatus 34 for maintaining a forward thrust on the high pressure rotor 12 for helping to maintain or control clearances or gaps between the high pressure rotor 12 and stator throughout the high pressure gas generator 10. Further referring to FIG. 2, the high pressure gas generator 10 has a high pressure rotor 12 including, in downstream flow relationship, a high pressure compressor 14, a combustor 52, and a high pressure turbine 16. The rotor 12 is rotatably supported about an engine centerline 28 by a forward bearing 20 in a front frame 22 and a rear bearing 24 disposed downstream of high pressure turbine 16 in a turbine frame 26.

The exemplary embodiment of the compressor 14 illustrated herein includes a five stage axial compressor 30 followed by the single stage centrifugal compressor 18 having an annular centrifugal compressor impeller 32. Outlet guide vanes 40 are disposed between the five stage axial compressor 30 and the single stage centrifugal compressor 18. Further referring to FIGS. 3 and 5, compressor discharge pressure (CDP) air 76 exits the impeller 32 and passes through a diffuser 42 and then through a deswirl cascade 44 into a combustion chamber 45 within the combustor 52. The combustion chamber 45 is surrounded by annular radially outer and inner combustor casings 46, 47. Air 76 is conventionally mixed with fuel provided by a plurality of fuel nozzles 48 and ignited and combusted in an annular combustion zone 50 bounded by annular radially outer and inner combustion liners 72, 73.

The combustion produces hot combustion gases 54 which flow through the high pressure turbine 16 causing rotation of the high pressure rotor 12 and continue downstream for further work extraction in a low pressure turbine 78 and final exhaust as is conventionally known. In the exemplary embodiment depicted herein, the high pressure turbine 16 includes, in downstream serial flow relationship, first and second high pressure turbine stages 55, 56 having first and second stage disks 60, 62. A high pressure shaft 64 of the high pressure rotor 12 connects the high pressure turbine 16 in rotational driving engagement to the impeller 32. A first stage nozzle 66 is directly upstream of the first high pressure turbine stage 55 and a second stage nozzle 68 is directly upstream of the second high pressure turbine stage. An annular cavity 74 is radially disposed between the inner combustor casing 47 and the high pressure shaft 64 of the high pressure rotor 12.

Referring to FIG. 3, the compressor discharge pressure (CDP) air 76 is discharged from the impeller 32 of the centrifugal compressor 18 and used to combust fuel in the combustor 52 and to cool components of turbine 16 subjected to the hot combustion gases 54; namely, the first stage nozzle 66, a first stage shroud 71 and the first stage disk 60. The compressor 14 includes a forward casing 110 and an aft casing 114 as more fully illustrated in FIGS. 1 and 2. The forward casing 110 generally surrounds the axial compressor 30 and the aft casing 114 generally surrounds the centrifugal compressor 18 and supports the diffuser 42 directly downstream of the centrifugal compressor 18. The compressor discharge pressure (CDP) air 76 is discharged from the impeller 32 of the centrifugal compressor 18 directly into the diffuser 42.

Figure 4:
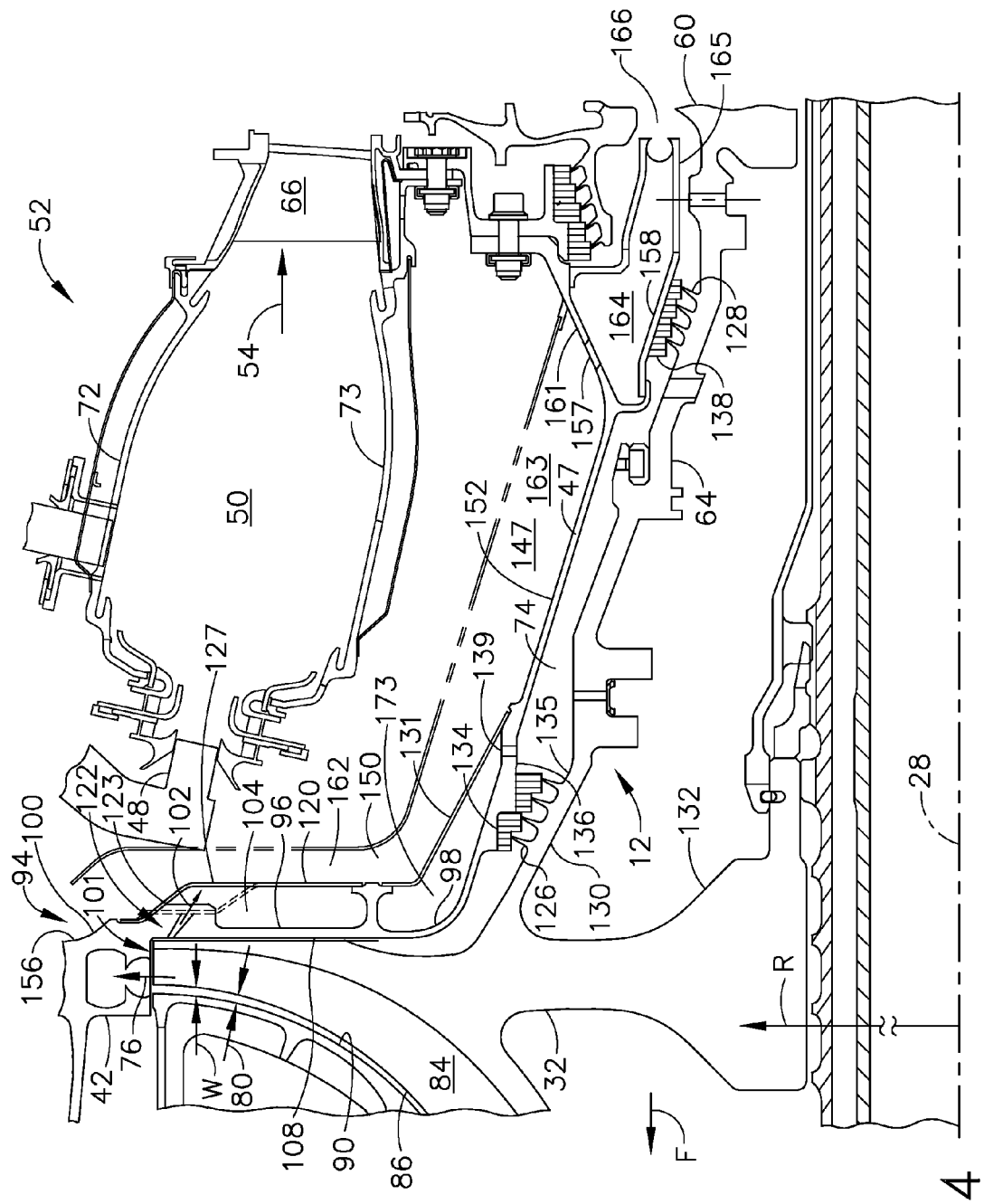
FIG. 4 is an enlarged sectional view illustration of the forward thrust apparatus and a turbine cooling system illustrated in FIG. 3.

Referring to FIGS. 2, 3, and 4, the impeller 32 includes a plurality of centrifugal compressor blades 84 radially extending from rotor disc portion 82. Opposite and axially forward of the compressor blades 84 is an annular blade tip shroud 90. The shroud 90 is adjacent to blade tips 86 of the compressor blades 84 defining an annular blade tip clearance 80 therebetween. The blade tip clearance 80 varies in axial width W in a radial direction R as measured from the engine centerline 28. It is desirable to minimize the blade tip clearance 80 during the engine operating cycle and avoid or minimize rubs between the shroud 90 and the blade tips 86 of the compressor blades 84, particularly, during engine accelerations such as during cold bursts.

It is known to provide sufficient forward rotor thrust to properly operate the impeller 32 in order to minimize the blade tip clearance 80 during the engine operating cycle in general to maintain or control clearances between the high pressure rotor 12 and stator throughout the high pressure gas generator 10. The forward thrust apparatus 34 is designed to provide this forward rotor thrust and is illustrated in more detail in FIGS. 4-7.

Figure 8:
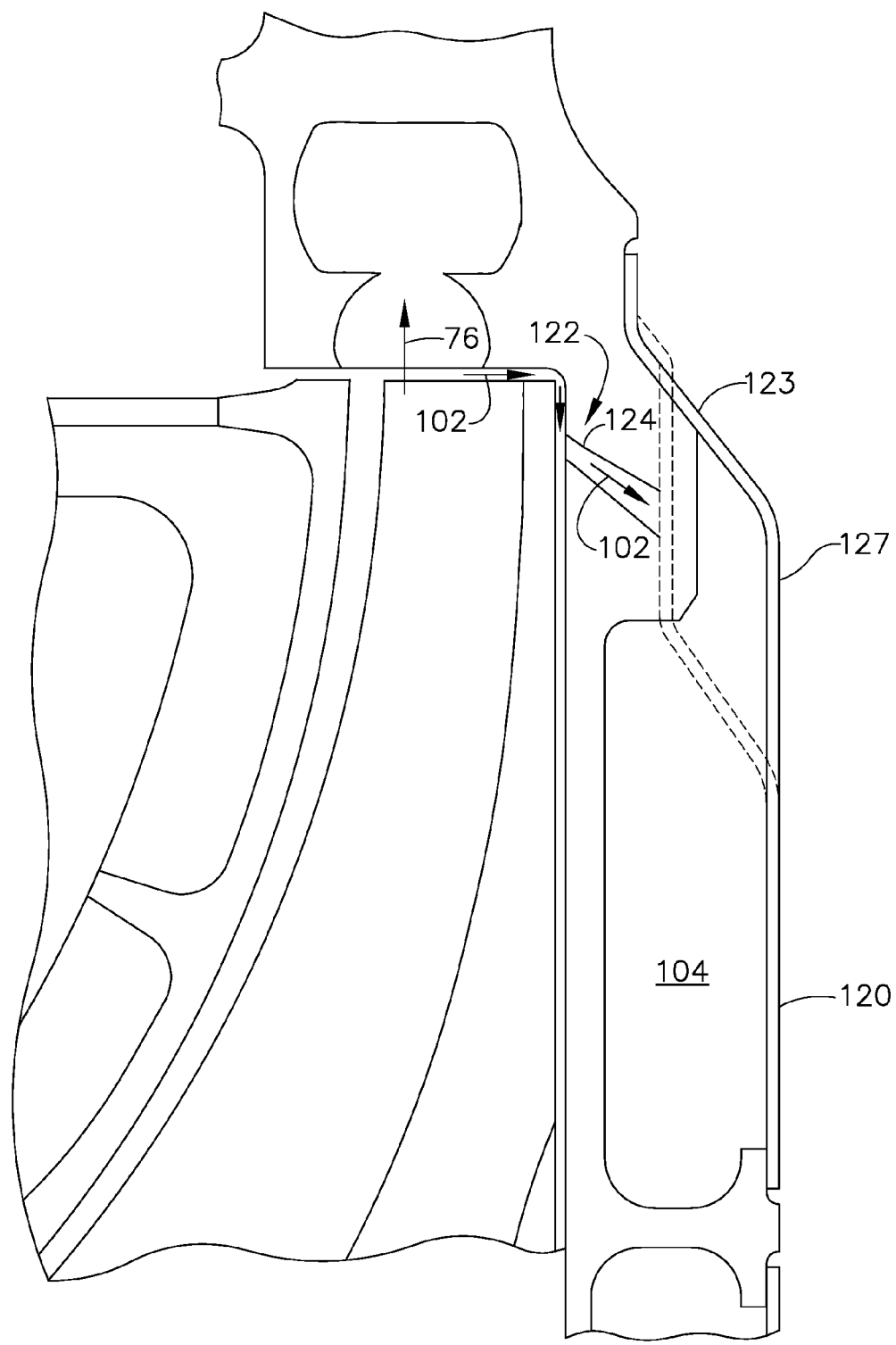
FIG. 8 is an enlarged sectional view illustration of bleeding impeller tip aft bleed flow between the impeller and the diffuser and into the forward thrust apparatus illustrated in FIG. 4.

Referring to FIGS. 3 and 4, an annular combustor stator assembly 94 includes an annular radially extending forward end wall 96 extending radially outwardly from and joined to the inner combustor casing 47 by an annular bend 98. The exemplary annular combustor stator assembly 94 illustrated herein is a unitary one piece element made from a single or one piece casting. A radially outer portion of the forward end wall 96 forms an aft wall 100 of the diffuser 42. An impeller bleed means 101 for bleeding impeller tip aft bleed flow 102 from between the impeller 32 and the diffuser 42 and flow the aft bleed flow 102 into an annular stator plenum 104 of the annular combustor stator assembly 94 as illustrated in greater detail in FIG. 8. The stator plenum 104 is bounded by a radially inner portion 108 of the forward end wall 96 and an annular cover 120 further illustrated in FIGS. 5 and 6. The annular cover 120 includes a cover aft wall 123 having a planar annular wall section 127 followed by a conical wall section 131. The annular cover 120 is attached to the forward end wall 96 and the inner combustor casing 47 and may be made of sheet metal.

Figure 7:
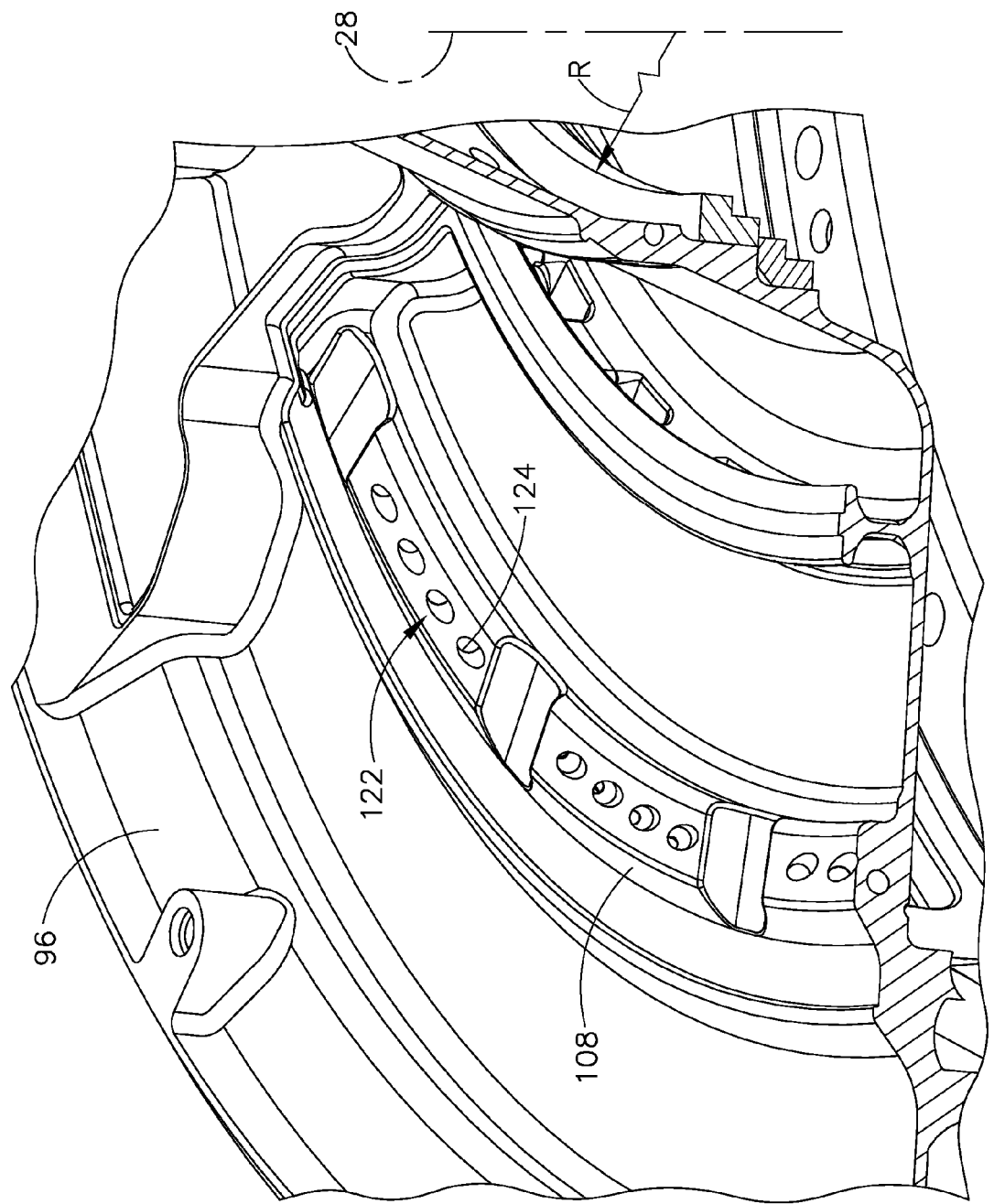
FIG. 7 is a perspective view illustration of conical diffusion holes through which impeller aft bleed air is diffused into the plenum illustrated in FIG. 3.

The impeller tip aft bleed flow 102 is diffused through a circumferentially arrayed plurality 122 of conical diffusion holes 124 in the inner portion 108 of the forward end wall 96 as further illustrtaed in FIG. 7. The conical diffusion holes 124 are illustrated herein as being conical but may be otherwise shaped. The conical diffusion holes 124 are also illustrated herein as being axially or circumferentially or axially and circumferentially angled which provides longer holes for a greater amount of diffusion with lower airflow losses through the holes.

Referring more specifically to FIGS. 3 and 4, the annular cavity 74 which is radially disposed between the inner combustor casing 47 and the high pressure shaft 64 of the high pressure rotor 12 is axially sealed by forward and aft thrust balance seals 126, 128. Note that the annular cover 120 is attached to the inner combustor casing 47 aft of the forward thrust balance seal 126. The forward thrust balance seal 126 is located on a radially outer surface 135 of an aft conical arm 130 of the impeller 32 of the rotor 12 immediately aft of an impeller bore 132 of the impeller 32. The forward thrust balance seal 126 seals against a forward thrust balance land 134 mounted on a radially inner surface 136 of the inner combustor casing 47. The aft thrust balance seal 128 is located on the radially outer surface 135 of the high pressure shaft 64 of the rotor 12 and seals against an aft thrust balance land 138 mounted to and extends radially outwardly of a plenum casing 158 used for cooling the high pressure turbine 16. Incorporating the rotating forward thrust balance seal directly on the impeller of the rotor 12 provides a more efficient stator architecture design allows for a low-loss clean air bleed circuit to cool the turbine.

High pressure air in the stator plenum 104 is created by diffusing the impeller tip aft bleed flow 102 through the conical diffusion holes 124 in the inner portion 108 of the forward end wall 96. The high pressure air in the stator plenum 104 is metered by precisely sized angled metering holes 139 in the inner combustor casing 47 (also illustrated in FIG. 5) to flow into the annular cavity 74 which provides a positive axial thrust in the forward direction F on the impeller 32. This relatively higher static pressure air in the stator plenum 104 pressurizes the annular cavity 74 between the inner combustor casing 47 and the high pressure shaft 64 of the high pressure rotor 12 (the stator and the rotor) and between the forward and aft thrust balance seals 126, 128 which pushes the impeller 32 forward to provide the necessary amount of forward rotor thrust.

Figure 5:
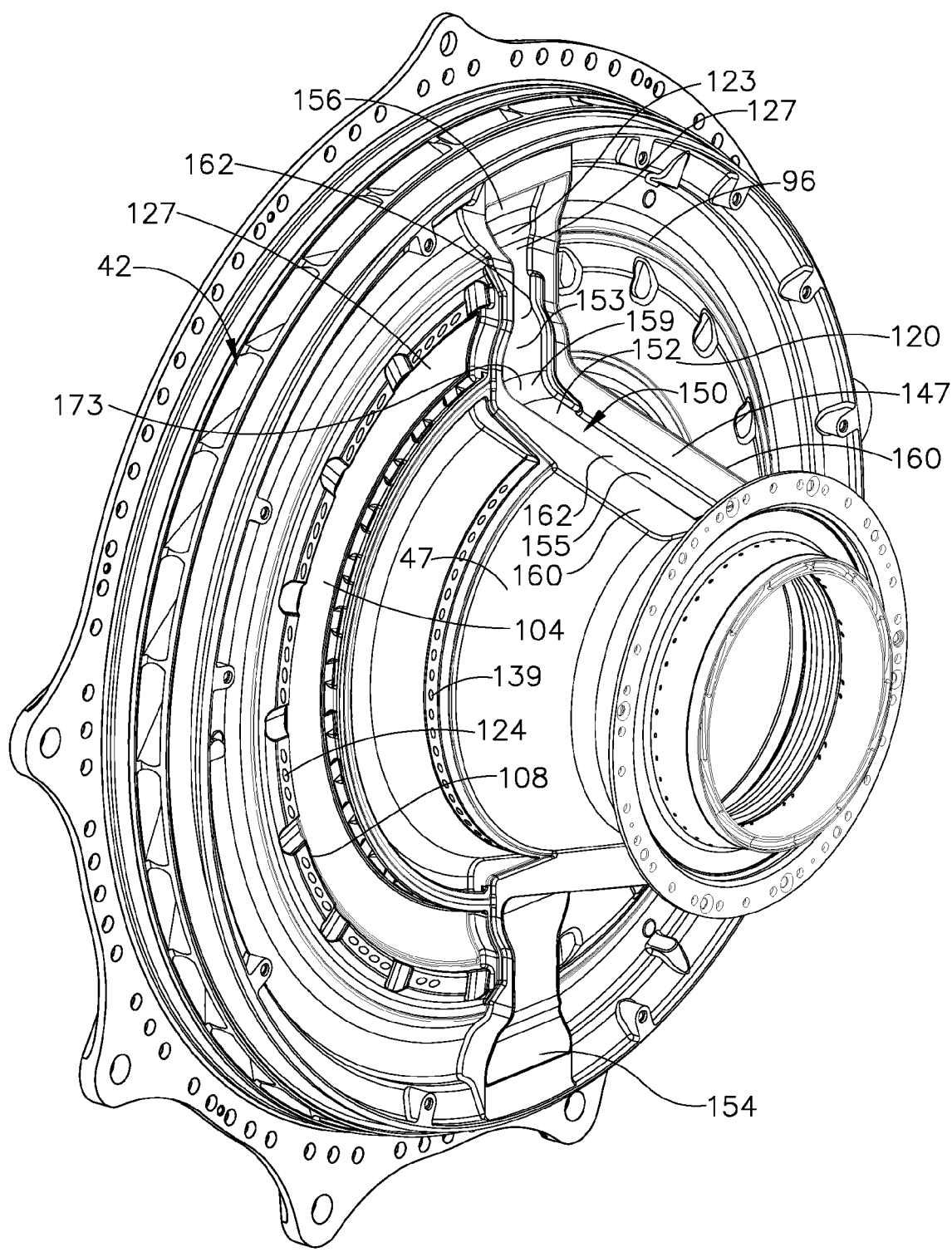
FIG. 5 is a perspective view illustration of a diffuser and inner combustor casing in the gas generator illustrated in FIG. 4.
Figure 6:
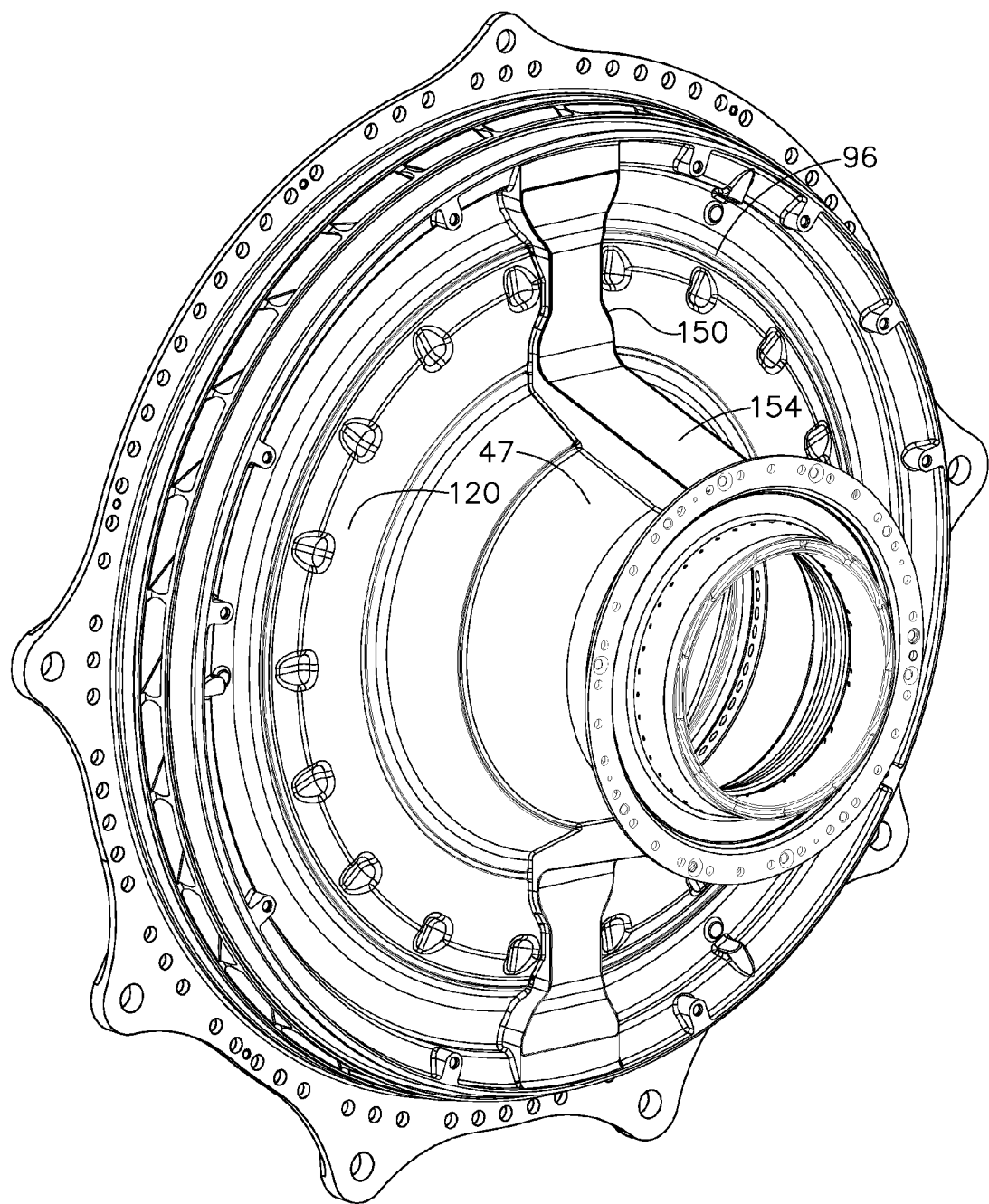
FIG. 6 is a perspective view illustration of a cover over the diffuser and inner combustor casing forming a plenum therebetween in the gas generator illustrated in FIG. 4.

Referring to FIGS. 4 and 5, the design of the size of the angled metering holes 139 is used to precisely control the amount of forward rotor thrust. The metering holes 139 are circumferentially angled. Bleeding air through the conical diffusion holes 124 in the inner portion 108 of the forward end wall 96 increases the amount of impeller tip aft bleed flow 102 and enables the impeller tip aft bleed flow 102 to achieve an empirically-derived optimal amount of the impeller tip aft bleed flow rate which, in turn, increases centrifugal compressor efficiency.

A turbine cooling system 137 with very low turning losses is illustrated in FIG. 3. The turbine cooling system 137 is used to cool high-pressure turbine (HPT) first stage blades 92 of the first stage disk 60 with clean cooling air 97 in order to minimize sand and/or dirt ingested into HPT blade cooling passages and, thus, prevent blocking of the small blade cooling passages and consequent blade failure. The clean cooling air 97 is bled at a bleed location 95 downstream of an outlet 140 of the diffuser 42 as the CDP air 76 enters the deswirl cascade 44 along an internal radius portion 133 thereof. The clean cooling air 97 bled in this manner is substantially free of particulate matter which could clog fine cooling passages in the first stage blades 92 of the first stage disk 60.

Referring to FIGS. 3-5, the clean cooling air 97 is bled into and collected in an annular manifold 148 and flowed radially inwardly through at least one or more cooling air channels 150. The exemplary embodiment of the turbine cooling system 137 illustrated herein includes two cooling air channels 150. Each of the cooling air channels 150 has a channel inner wall 152 formed and running along a radially outer portion 156 of the forward end wall 96, the annular cover 120, and the inner combustor casing 47. The channel inner wall 152 includes a generally radially extending radial wall section 153 connected to a generally axially aftwardly extending axial wall section 155 by a curved wall section 159.

Circumferentially spaced apart channel side walls 160 extend outwardly from the channel inner wall 152. A channel outer wall 154 spaced outwardly from the channel inner wall 152 is attached to the channel side walls 160 thus sealing the cooling air channel 150. The channel inner and outer walls 152, 154 may be made from sheet metal. The cooling air channel 150 terminates at an aft conical section 161 of the inner combustor casing 47. The cooling air channel 150 thus includes a generally radially extending section 162 followed by a generally axially aftwardly extending section 163 which terminates at the aft conical section 161. A bend section 173 of the cooling air channel 150 connects the generally radially extending section 162 to the generally axially aftwardly extending section 163. The generally axially aftwardly extending section 163 is slightly angled radially inwardly going from the bend section 173 to the aft conical section 161 and the cooling air plenum 164. This provides a substantially straight flowpath for the clean cooling air 97 with a minimal amount of flow turning losses through the combustor 52. This provides cooling passages 147 for the clean cooling air 97 that run along along the radially outer portion 156 of the forward end wall 96, the annular cover 120, and the inner combustor casing 47. The cooling passages 147 provide a straight through uninterrupted flowpath through the combustor 52 with no turning losses.

Cooling air apertures 157 in the aft conical section 161 allow the clean cooling air 97 to flow directly into an annular cooling air plenum 164 within the plenum casing 158. The clean cooling air 97 is accelerated by a one or more accelerators 165 attached to the plenum casing 158 at an aft end of the cooling air plenum 164. The channels 150 terminate at and are in fluid communication with the annular cooling air plenum 164 which is in fluid supply communication with the one or more accelerators 165. The accelerators 165 inject the clean cooling air 97 into a stage one disk forward cavity 166 at a high tangential speed approaching wheel speed of the first stage disk 60 at a radial position of the accelerator 165. The clean cooling air 97 then flows through and cools the stage disk 60 and the first stage blades 92. The cooling air channels 150 terminating at the aft conical section 161 directly bounding the cooling air plenum 164 helps to provide a substantially straight flowpath for the clean cooling air 97 with a minimal amount of flow turning losses through the combustor 52.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine centrifugal compressor axial forward thrust apparatus comprising:
   an annular centrifugal compressor impeller of a high pressure rotor,
   an impeller bleed means for bleeding impeller tip aft bleed flow from between the impeller and a diffuser directly downstream of the impeller,
   a pressurizing means for using the aft bleed flow to pressurize an annular cavity extending radially between an inner combustor casing and the high pressure rotor and extending axially between a forward thrust balance seal on the impeller and an aft thrust balance seal and the forward thrust balance seal being located on an aft conical arm of the impeller of the rotor.

2. An apparatus as claimed in claim 1, further comprising:
   an annular stator plenum in fluid communication with the annular cavity,
   the annular stator plenum bounded in part by a forward end wall, and
   the pressurizing means including conical diffusion holes in the forward end wall.

3. An apparatus as claimed in claim 2, further comprising the conical diffusion holes being axially or circumferentially or axially and circumferentially angled.

4. A gas turbine engine centrifugal compressor axial forward thrust apparatus comprising:
   an annular centrifugal compressor impeller of a high pressure rotor,
   an impeller bleed means for bleeding impeller tip aft bleed flow from between the impeller and a diffuser directly downstream of the impeller,
   a pressurizing means for using the aft bleed flow to pressurize an annular cavity extending radially between an inner combustor casing and the high pressure rotor and extending axially between forward and aft thrust balance seals,
   an annular stator plenum in fluid communication with the annular cavity,
   the annular stator plenum bounded in part by a forward end wall,
   the pressurizing means including conical diffusion holes in the forward end wall, and
   angled metering holes in the inner combustor casing between the annular stator plenum and the annular cavity.

5. An apparatus as claimed in claim 4, further comprising the metering holes being circumferentially angled.

6. An apparatus as claimed in claim 1, further comprising a forward thrust balance land in sealing engagement with the forward thrust balance seal on a radially inner surface of the inner combustor casing and an aft thrust balance land in sealing engagement with the aft thrust balance seal.

7. A gas turbine engine centrifugal compressor axial forward thrust apparatus comprising:
   an annular centrifugal compressor impeller of a high pressure rotor,
   an impeller bleed means for bleeding impeller tip aft bleed flow from between the impeller and a diffuser directly downstream of the impeller,
   a pressurizing means for using the aft bleed flow to pressurize an annular cavity extending radially between an inner combustor casing and the high pressure rotor and extending axially between forward and aft thrust balance seals,
   a forward thrust balance land in sealing engagement with the forward thrust balance seal on a radially inner surface of the inner combustor casing,
   an aft thrust balance land in sealing engagement with the aft thrust balance seal, and
   the forward thrust balance seal located on an aft conical arm of the impeller of the rotor.

8. An apparatus as claimed in claim 7, further comprising:
   an annular stator plenum in fluid communication with the annular cavity,
   the annular stator plenum bounded in part by a forward end wall, and
   the pressurizing means including conical diffusion holes in the forward end wall.

9. An apparatus as claimed in claim 8, further comprising the conical diffusion holes being axially or circumferentially or axially and circumferentially angled.

10. An apparatus as claimed in claim 8, further comprising angled metering holes in the inner combustor casing between the annular stator plenum and the annular cavity.

11. An apparatus as claimed in claim 10, further comprising the metering holes being circumferentially angled.

12. A gas turbine engine assembly comprising:
    a combustor between a high pressure compressor and a high pressure turbine,
    a high pressure rotor including a centrifugal compressor having an annular centrifugal compressor impeller directly adjacent to and upstream of a diffuser,
    an impeller bleed means for bleeding impeller tip aft bleed flow from between the impeller and the diffuser,
    a pressurizing means for using the aft bleed flow to pressurize an annular cavity extending radially between the inner combustor casing and the high pressure rotor and extending axially between a forward thrust balance seal on the impeller and an aft thrust balance seal and the forward thrust balance seal being located on an aft conical arm of the impeller of the rotor.

13. An assembly as claimed in claim 12, further comprising:
    an annular combustor stator assembly including a forward end wall extending radially outwardly from and joined to the inner combustor casing,
    a radially outer portion of the forward end wall being an aft wall of the diffuser,
    a stator plenum disposed between and in fluid communication with the impeller and the annular cavity, and
    the stator plenum being in part bounded by a radially inner portion of the forward end wall.

14. An assembly as claimed in claim 13, further comprising the pressurizing means including conical diffusion holes in the radially inner portion of the forward end wall.

15. An assembly as claimed in claim 14, further comprising the conical diffusion holes being axially or circumferentially or axially and circumferentially angled.

16. An assembly as claimed in claim 14, further comprising the stator plenum being bounded by the radially inner portion of the forward end wall and an annular cover spaced axially aftwardly of the radially inner portion of the forward end wall.

17. A gas turbine engine assembly comprising:
a combustor between a high pressure compressor and a high pressure turbine,
a high pressure rotor including a centrifugal compressor having an annular centrifugal compressor impeller directly adjacent to and upstream of a diffuser,
an impeller bleed means for bleeding impeller tip aft bleed flow from between the impeller and the diffuser,
a pressurizing means for using the aft bleed flow to pressurize an annular cavity extending radially between the inner combustor casing and the high pressure rotor and extending axially between forward and aft thrust balance seals,
an annular combustor stator assembly including a forward end wall extending radially outwardly from and joined to the inner combustor casing,
a radially outer portion of the forward end wall being an aft wall of the diffuser,
a stator plenum disposed between and in fluid communication with the impeller and the annular cavity,
the stator plenum in part bounded by a radially inner portion of the forward end wall,
the pressurizing means including conical diffusion holes in the radially inner portion of the forward end wall,
the stator plenum being bounded by the radially inner portion of the forward end wall and an annular cover spaced axially aftwardly of the radially inner portion of the forward end wall, and
angled metering holes in the inner combustor casing between the annular stator plenum and the annular cavity.

18. An assembly as claimed in claim 17, further comprising the metering holes being circumferentially angled.

19. An assembly as claimed in claim 12, further comprising a forward thrust balance land in sealing engagement with the forward thrust balance seal on a radially inner surface of the inner combustor casing and an aft thrust balance land in sealing engagement with the aft thrust balance seal.

20. A gas turbine engine assembly comprising:
a combustor between a high pressure compressor and a high pressure turbine,
a high pressure rotor including a centrifugal compressor having an annular centrifugal compressor impeller directly adjacent to and upstream of a diffuser,
an impeller bleed means for bleeding impeller tip aft bleed flow from between the impeller and the diffuser,
a pressurizing means for using the aft bleed flow to pressurize an annular cavity extending radially between the inner combustor casing and the high pressure rotor and extending axially between forward and aft thrust balance seals,
a forward thrust balance land in sealing engagement with the forward thrust balance seal on a radially inner surface of the inner combustor casing and an aft thrust balance land in sealing engagement with the aft thrust balance seal, and
the forward thrust balance seal being located on an aft conical arm of the impeller of the rotor.

21. An assembly as claimed in claim 20, further comprising an annular stator plenum in fluid communication with the annular cavity and bounded in part by a forward end wall and the pressurizing means including conical diffusion holes in the forward end wall.

22. An assembly as claimed in claim 21, further comprising the conical diffusion holes being axially or circumferentially or axially and circumferentially angled.

23. An assembly as claimed in claim 22, further comprising angled metering holes in the inner combustor casing between the annular stator plenum and the annular cavity.

24. An assembly as claimed in claim 23, further comprising the metering holes being circumferentially angled.

25. A gas turbine engine assembly comprising:
a combustor between a high pressure compressor and a high pressure turbine,
a high pressure rotor including a centrifugal compressor having an annular centrifugal compressor impeller directly adjacent to and upstream of a diffuser,
an impeller bleed means for bleeding impeller tip aft bleed flow from between the impeller and the diffuser,
a pressurizing means for using the aft bleed flow to pressurize an annular cavity extending radially between the inner combustor casing and the high pressure rotor and extending axially between forward and aft thrust balance seals,
a cooling air bleed means for bleeding clean cooling air from a bleed location downstream of an outlet of the diffuser,
one or more channels in fluid communication with the cooling air bleed means,
each of the one or more channels having a generally radially extending section followed by a generally axially aftwardly extending section, and
the one or more channels in fluid communication with an annular cooling air plenum having one or more accelerators.

26. An assembly as claimed in claim 25, further comprising the cooling air bleed means including an annular manifold in fluid communication with a bleed location downstream of an outlet of the diffuser where compressor discharge pressure air enters a deswirl cascade along an internal radius portion.

27. An assembly as claimed in claim 25, further comprising:
an annular combustor stator assembly including a radially extending forward end wall extending radially outwardly from and joined to the inner combustor casing,
a radially outer portion of the forward end wall being an aft wall of the diffuser,
a stator plenum disposed between and in fluid communication with the impeller and the annular cavity, and
the stator plenum being in part bounded by a radially inner portion of the forward end wall.

28. An assembly as claimed in claim 27, further comprising the pressurizing means including conical diffusion holes in the radially inner portion of the forward end wall.

29. An assembly as claimed in claim 28, further comprising the conical diffusion holes being axially or circumferentially or axially and circumferentially angled.

30. An assembly as claimed in claim 28, further comprising the stator plenum being bounded by the radially inner portion of the forward end wall and an annular cover spaced axially aftwardly of the radially inner portion of the forward end wall.

31. An assembly as claimed in claim 29, further comprising angled metering holes in the inner combustor casing between the annular stator plenum and the annular cavity.

32. An assembly as claimed in claim 31, further comprising the metering holes being circumferentially angled.

33. An assembly as claimed in claim 30, further comprising:
each of the cooling channels having a channel inner wall running along a radially outer portion of the forward end wall, the annular cover, and the inner combustor casing;
the annular cover including a cover aft wall having a circular wall section followed by a conical wall section;

circumferentially spaced apart channel side walls attached to and extending outwardly from the channel inner wall; and a channel outer wall spaced outwardly from the channel inner wall and attached to the channel side walls.

34. An assembly as claimed in claim 30, further comprising each of the cooling channels terminating at an aft conical section of the inner combustor casing between the annular cooling air plenum the cooling channels and cooling air apertures in the aft conical section.

35. An assembly as claimed in claim 34, further comprising a forward thrust balance land in sealing engagement with the forward thrust balance seal on a radially inner surface of the inner combustor casing and an aft thrust balance land in sealing engagement with the aft thrust balance seal.

36. An assembly as claimed in claim 35, further comprising the forward thrust balance seal being located on an aft conical arm of the impeller of the rotor.

37. An assembly as claimed in claim 36, further comprising an annular stator plenum in fluid communication with the annular cavity and bounded in part by a forward end wall and the pressurizing means including conical diffusion holes in the forward end wall.

38. An assembly as claimed in claim 36, further comprising the conical diffusion holes being axially or circumferentially or axially and circumferentially angled.

39. An assembly as claimed in claim 38, further comprising angled metering holes in the inner combustor casing between the annular stator plenum and the annular cavity.

40. An assembly as claimed in claim 39, further comprising the metering holes being circumferentially angled.

* * * * *